(12) United States Patent
Hollowell

(10) Patent No.: US 12,250,352 B2
(45) Date of Patent: Mar. 11, 2025

(54) PRINTER FOR APPLYING TEMPORARY TATTOOS

(71) Applicant: Sueann Hollowell, Conyers, GA (US)

(72) Inventor: Sueann Hollowell, Conyers, GA (US)

( * ) Notice: Subject to any disclaimer, the term of this patent is extended or adjusted under 35 U.S.C. 154(b) by 0 days.

(21) Appl. No.: 18/627,017

(22) Filed: Apr. 4, 2024

(65) Prior Publication Data

US 2024/0340384 A1      Oct. 10, 2024

Related U.S. Application Data

(60) Provisional application No. 63/494,760, filed on Apr. 6, 2023.

(51) Int. Cl.
    *H04N 1/23* (2006.01)
    *B41J 3/407* (2006.01)
    *H04N 1/00* (2006.01)

(52) U.S. Cl.
    CPC .......... *H04N 1/2384* (2013.01); *B41J 3/4073* (2013.01); *H04N 1/00267* (2013.01); *H04N 1/2323* (2013.01); *B41J 2203/011* (2020.08)

(58) Field of Classification Search
    CPC ........... H04N 1/00087; H04N 1/00267; H04N 1/00408; H04N 1/00411; H04N 1/0044;
    (Continued)

(56) References Cited

U.S. PATENT DOCUMENTS

| 6,286,517 | B1 | 9/2001 | Weber et al. |
| 6,341,831 | B1 * | 1/2002 | Weber .................... B41J 3/4073 347/1 |

(Continued)

FOREIGN PATENT DOCUMENTS

| FR | 3083122 A1 * | 1/2020 |
| KR | 102246415 B1 * | 4/2019 |

(Continued)

OTHER PUBLICATIONS

Prinker S Temporary Tattoo Device Package for Your Instant Custom Temporary Tattoos with Premium Cosmetic Black Ink—Compatible w/iOS & Android devices, https://www.amazon.com/Prinker-Temporary-Package-Instant-Cosmetic/dp/B0821ZJCQH?th=1, Mar. 6, 2023, 10 pgs.

(Continued)

*Primary Examiner* — Scott A Rogers
(74) *Attorney, Agent, or Firm* — BEKIARES ELIEZER LLP

(57) ABSTRACT

An apparatus may include a housing defining a first opening, a second opening, and a cavity connecting the first opening to the second opening, the cavity may receive a user's extremity through the first opening and to allow egress through the second opening. An apparatus may include a visualization module configured to superimpose visual media equivalent to a desired tattoo onto the user's extremity within the cavity. An apparatus may include a printer module disposed within the cavity to apply the desired tattoo, the printer module including one or more print heads for administering temporary tattoo ink to apply the temporary tattoo to the user's extremity. An apparatus may include a user interface terminal configured to allow a user to select the temporary tattoo from among a number of candidate temporary tattoos and to adjust one or more properties of the temporary tattoo prior to application of the temporary tattoo.

20 Claims, 9 Drawing Sheets

(58) Field of Classification Search
CPC .......... H04N 1/00469; H04N 1/00474; H04N 1/00493; H04N 1/00496; H04N 1/00519; H04N 1/00543; H04N 1/00546; H04N 1/00564; H04N 1/00702; H04N 1/00708; H04N 1/0071; H04N 1/00713; H04N 1/00718; H04N 1/00721; H04N 1/00726; H04N 1/00734; H04N 1/00737; H04N 1/00771; H04N 1/00774; H04N 1/00779; H04N 1/034; H04N 1/2323; H04N 1/2338; H04N 1/2384; H04N 1/2392; H04N 1/387; H04N 1/3872; H04N 1/3873; H04N 1/3875; H04N 1/3877; H04N 1/3878; H04N 1/393; H04N 1/3935; B41J 3/4073; B41J 2203/011; B41J 2/005; B41J 2/01

See application file for complete search history.

(56) References Cited

U.S. PATENT DOCUMENTS

| | | | | |
|---|---|---|---|---|
| 7,207,639 | B2* | 4/2007 | Kachi | B41J 11/0065 |
| | | | | 347/14 |
| 8,083,422 | B1* | 12/2011 | Simmons | G01B 21/00 |
| | | | | 358/1.18 |
| 8,363,079 | B2* | 1/2013 | Fujinawa | B41J 3/44 |
| | | | | 347/225 |
| 8,730,518 | B2* | 5/2014 | Williams | H04N 1/107 |
| | | | | 235/472.01 |
| 9,205,672 | B1* | 12/2015 | Bitoh | B41J 3/546 |
| 9,253,963 | B2 | 2/2016 | Mays et al. | |
| 9,277,799 | B2 | 3/2016 | Takaleh | |
| 9,340,038 | B2* | 5/2016 | Yamasaki | B41J 3/407 |
| 9,463,644 | B2* | 10/2016 | Yamasaki | B41J 3/407 |
| 9,486,050 | B2* | 11/2016 | Yamasaki | G06T 11/203 |
| 9,694,623 | B2* | 7/2017 | Bitoh | A45D 29/00 |
| 9,955,764 | B2 | 5/2018 | Yoshigai | |
| 10,334,125 | B2* | 6/2019 | Suzuki | H04N 1/00482 |
| 10,553,006 | B2 | 2/2020 | Iglehart et al. | |
| 10,621,812 | B1* | 4/2020 | McNenny | A61K 8/0245 |
| 11,064,784 | B2* | 7/2021 | Lin | G06T 7/90 |
| 11,068,952 | B1* | 7/2021 | Ankave | G06F 16/9537 |
| 11,103,041 | B2 | 8/2021 | Walia et al. | |
| 11,220,114 | B2 | 1/2022 | Lee et al. | |
| 11,547,841 | B2 | 1/2023 | Azdoud et al. | |
| 11,717,070 | B2* | 8/2023 | Walia | B41J 3/407 |
| | | | | 358/1.9 |
| 2002/0070988 | A1* | 6/2002 | Desormeaux | B41J 3/407 |
| | | | | 347/8 |
| 2004/0246327 | A1* | 12/2004 | Elzi | B41J 3/407 |
| | | | | 347/109 |
| 2008/0247637 | A1* | 10/2008 | Gildenberg | A61B 34/70 |
| | | | | 901/41 |
| 2012/0040314 | A1 | 2/2012 | Rubino, Jr. | |
| 2014/0236019 | A1 | 8/2014 | Rahum | |
| 2016/0275518 | A1 | 9/2016 | Bowles et al. | |
| 2020/0171831 | A1* | 6/2020 | Lee | B41J 3/407 |
| 2021/0386987 | A1 | 12/2021 | Azdoud et al. | |
| 2022/0323736 | A1* | 10/2022 | Azdoud | A61M 37/0084 |
| 2024/0140108 | A1* | 5/2024 | Kobayashi | G06F 3/1256 |

FOREIGN PATENT DOCUMENTS

| | | | | |
|---|---|---|---|---|
| WO | WO-2015193513 | A1* | 12/2015 | ........ A61M 37/0084 |
| WO | WO-2016108193 | A1* | 7/2016 | .............. A61K 8/00 |
| WO | 2017223088 | A1 | 12/2017 | |
| WO | 2020178818 | A1 | 9/2020 | |
| WO | WO 2024/156928 | A1* | 8/2024 | |

OTHER PUBLICATIONS

Inkhunter, Try Tattoo Designs on the App Store, https://apps.apple.com/us/app/inkhunter-try-tattoo-designs/id991558368, Mar. 6, 2023, 4 pgs.

3D Printer X Tattoo Machine, https://www.instructables.com/3D-PRINTER-X-TATTOO-MACHINE/, Mar. 6, 2023, 24 pgs.

International Search Report and Written Opinion dated Jul. 15, 2024 cited in Application No. PCT/US24/23181, 16 pgs.

* cited by examiner

PRINTER FOR APPLYING TEMPORARY TATTOOS

RELATED APPLICATION

Under provisions of 35 U.S.C. § 119(e), the Applicant claims benefit of U.S. Provisional Application No. 63/494,760 filed on Apr. 6, 2023, and having inventors in common, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF DISCLOSURE

The present disclosure generally relates to temporary body art applications. Specifically, the present disclosure relates to systems and methods for applying temporary tattoos using digital processing technologies.

BACKGROUND

In some situations, one may want to make a visual expression via temporary tattoo. For example, a fan of a particular sports team may want to demonstrate team support or loyalty via a printing graphic design on their hand or arm. Thus, the conventional strategy is to print a temporary tattoo on a substrate, then transfer the temporary tattoo using water or another solution to adhere the tattoo to the hand or arm of a user.

This often causes problems because the conventional strategy does not allow for real-time adjustment of the tattoo based on the unique proportions of the user, and does not allow the user to preview what the tattoo will look like on the user prior to application, which often results in an undesirable temporary tattoo. This conventional strategy does not allow for a dynamic or interactive visualization experience. For example, temporary tattoos cannot be easily modified or customized once applied, and digital simulations may not accurately represent how a tattoo looks on the curved and variable surfaces of human skin. Furthermore, the process of applying temporary tattoos traditionally lacks precision, which may lead to dissatisfaction with the placement or appearance of the tattoo. In some situations, users may seek to apply temporary tattoos for various reasons, such as for aesthetic purposes or to test a design before committing to a permanent tattoo. Traditionally, these temporary tattoos are applied using pre-designed stickers or by manual application, which limits customization. This often leads a mismatch between the user's expectations and the actual appearance of the tattoo on their skin. For example, the colors and details of a temporary tattoo may appear differently on the skin than they do on paper or in a digital preview. Additionally, users with unique skin tones or textures may find that standard temporary tattoos do not blend seamlessly with their skin, resulting in an artificial or unappealing look.

Moreover, the conventional strategy for applying temporary tattoos does not accommodate personalization to the user's specific body part dimensions or curvature. Each user's body is unique, and a design that looks appealing on one part of the body may not suit another part due to differences in skin texture, curvature, or underlying muscle and bone structures. Thus, users may be unable to visualize how a design will conform to the contours of their specific body part, leading to potential dissatisfaction with the final result.

Another challenge with traditional temporary tattoo application methods is the lack of interactivity in the design process. Users typically select from pre-existing designs without the ability to modify or interact with these designs in real-time. This limits the user's creative expression and personal connection to the tattoo design. Furthermore, once a temporary tattoo has been applied, making adjustments or corrections to the design or its placement is often not feasible without removing the tattoo and starting the process over, which can be time-consuming and wasteful.

In summary, the conventional approach to applying temporary tattoos faces several limitations, including a lack of customization, precision, and interactivity, which may lead to user dissatisfaction. These challenges highlight the need for a more flexible and user-centric method for applying temporary tattoos that can address these issues. Accordingly, there is a need for a temporary tattooing device that allows for customization, modification, and projection/rendering of the tattoo onto the extremity of a user prior to application.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In one aspect, the present disclosure provides a temporary tattooing apparatus comprising: a housing comprising: a plurality of walls defining a cavity, a first opening defining an entrance to the cavity and operative to receive a user extremity, a second opening opposing the first opening and configured for egress of the user extremity to from the first opening, through the cavity, and out of the second opening, one or more transparent wall portions operative for the user to view within the cavity, and an Augmented Reality ("AR") module integrated into the one or more transparent wall portions, the AR module comprising: a visual projection means operative to superimpose visual media equivalent to a desired tattoo onto the extremity of the user extremity placed within the cavity, and a plurality of AR sensors configured to calibrate the visual media in accordance with the geospatial location of the extremity of the user within the cavity; a printer module disposed within the cavity and configured to print the desired temporary tattoo onto the extremity of the user, the printer module comprising: a printer head configured to administer temporary tattoo ink to the extremity of the user, an ink cartridge tubularly connected to the ink cartridge and configured to provide temporary tattoo ink to the ink cartridge, and a motor, track, and rail system operative to facilitate administration of ink via the printer head within a predetermined operational area, and one or more sensors configured to map and geospatially detect the user extremity, one or more other sensors configured to calibrate, adjust, and coordinate operation of the printer module in accordance with the user extremity and the a barrier operative to adjust the operational area of the printer head responsive to dimensions of a specified user extremity and the desired temporary tattoo; and one or more computing devices in operative communication with the AR module, the barrier, and the printer module operative to transmit, receive, and coordinate instructions for operation of the temporary tattoo apparatus.

In another aspect, the present disclosure may provide a method for generating AR compatible tattoo digital files, the method comprising: providing a plurality of rules and/or directions related to an AR framework to a processing module for facilitating conversion of a digital tattoo image into an AR compatible tattoo digital file; receiving the digital tattoo image in a digital media format; preprocessing the digital tattoo images; performing a detection algorithm to detect visual components of the digital tattoo image; converting the analyzed digital tattoo images into a lattice for visual rendering and overlaying; and converting the resulting lattice with the analyzed tattoo image into AR compatible tattoo digital files.

In another aspect, the present disclosure may provide a method for providing a temporary tattoo, the method comprising: selecting a temporary tattoo for administration to an extremity of a user; inserting the extremity of the user into a cavity of the apparatus via a first opening, at least a portion of the extremity being visible through one or more transparent wall portions of a housing of the apparatus; transmitting data related to the selected temporary tattoo to a processing module for processing via an AR framework responsive to receiving the processed selected temporary tattoo data, superimposing, via an AR module integrated into the one or more transparent wall portions, the selected temporary tattoo onto the extremity of the user; adjusting placement of the temporary tattoo on the extremity of the user; confirming administration of the temporary tattoo; and responsive to the confirming, transmitting machine readable instructions to a printer head integrated into the cavity, to print the selected tattoo onto the extremity of the user.

Consistent with embodiments of the present disclosure, a temporary tattooing apparatus may include a housing. The housing may define a first opening, a second opening, and a cavity. The cavity may connect the first opening to the second opening. This cavity may be designed to receive a user's extremity through the first opening. It may allow egress through the second opening. A visualization module may be configured within the apparatus. This module may superimpose visual media equivalent to a desired tattoo onto the user's extremity within the cavity. A printer module may be disposed within the cavity. This module may apply the desired tattoo. The printer module may include one or more print heads. These print heads may be for administering temporary tattoo ink. The printer module may apply the temporary tattoo to the user's extremity. A user interface terminal may be configured within the apparatus. This terminal may allow a user to select the temporary tattoo from among a number of candidate temporary tattoos. It may also allow the user to adjust one or more properties of the temporary tattoo prior to application.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
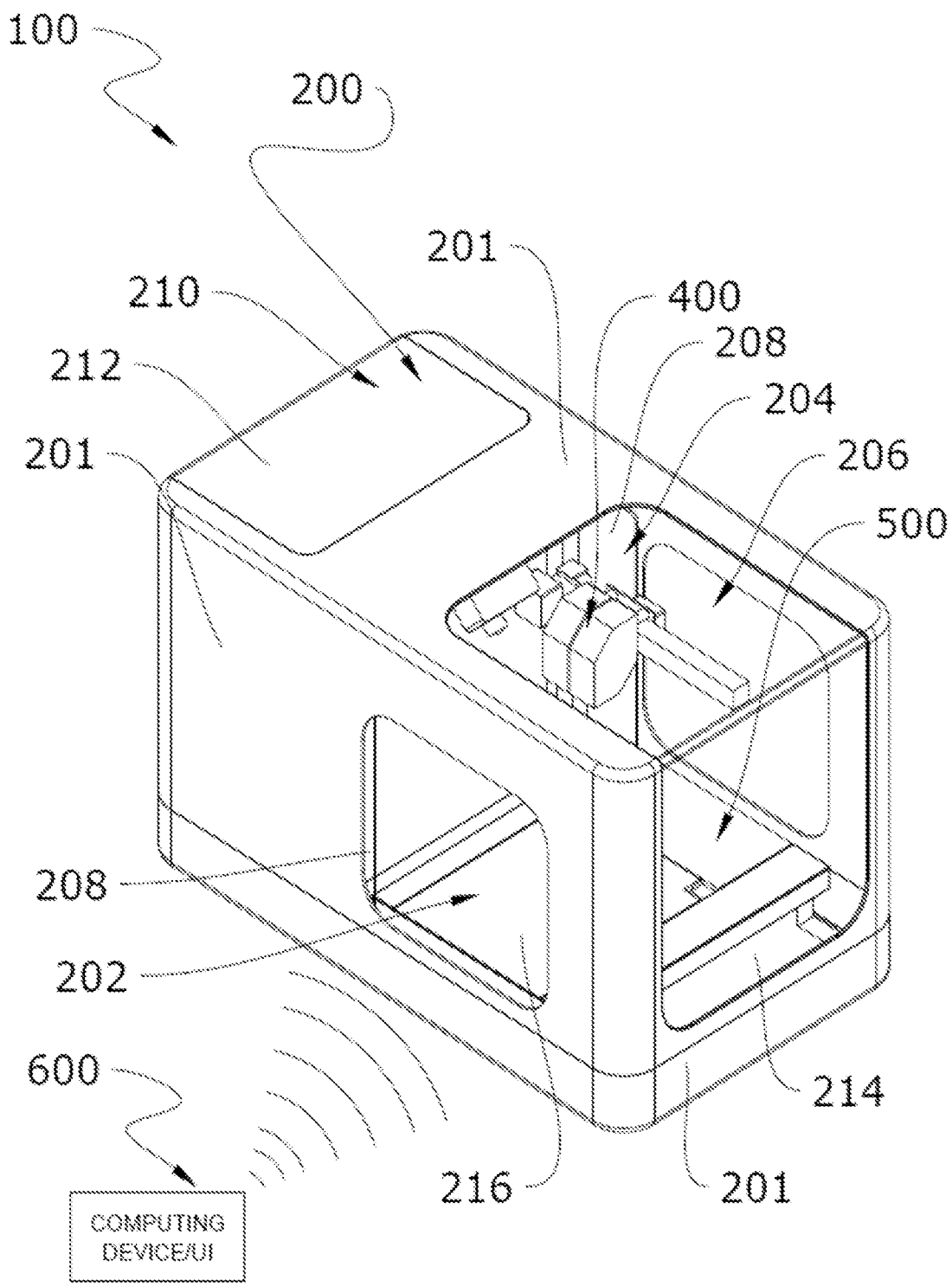
FIG. 1 illustrates a front perspective view of a temporary tattooing apparatus 100, shown in its operating environment.
Figure 2:
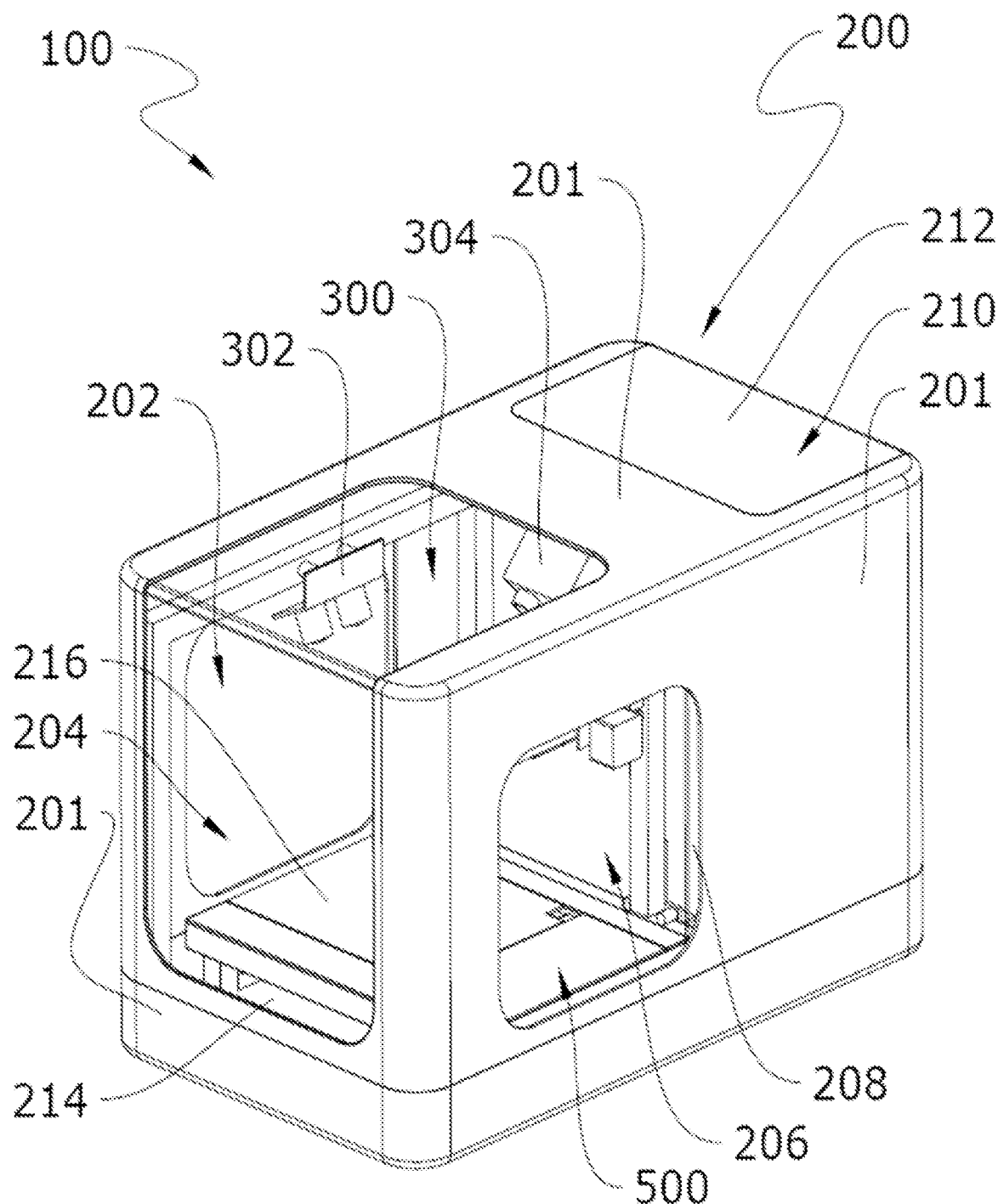
FIG. 2 illustrates a rear perspective view thereof.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of devices and methods for administering tattoos and temporary tattoos, embodiments of the present disclosure are not limited to use only in this context.

I. Apparatus Overview

This overview is provided to introduce a selection of concepts in a simplified form that are further described below. This overview is not intended to identify key features or essential features of the claimed subject matter. Nor is this overview intended to be used to limit the claimed subject matter's scope.

A temporary tattooing apparatus ("apparatus") 100 may be provided. the apparatus 100 may be used for administration of temporary tattoos on an extremity, for example, a hand or a forearm, of a user. The apparatus 100 may have an operating area enclosed by four walls. The operating area may be accessed via openings on two sides for insertion of a hand or a forearm.

Prior to inserting the extremity, a user may be provided with a user interface ("UI") to create, select, customize, and/or adjust a temporary tattoo for printing onto the skin of the extremity. After the temporary tattoo is chosen, the user may be prompted to choose which extremity to apply the temporary tattoo on. In the instance when the user chooses their hand for tattooing, a wall may extend within the operating area to accommodate the hand and limit the range of motion for the hand for more accurate tattooing. In the instance when the user chooses their forearm for tattooing, the barrier remains collapsed, allowing for the hand to pass through the first opening and out of the second opening thereby allowing the forearm to be properly oriented within the operating area.

After orienting the extremity into the operating area, the extremity may be viewable via a transparent window oriented on top of the apparatus 100. The window may have Augmented Reality ("AR") and/or protectional integrations such that the selected temporary tattoo may be overlayed onto the inserted extremity. The user may then have the option to further adjust, customize and/or change the temporary tattoo based on the projected tattoo on the extremity.

Once finalized and ready for tattooing, a printer head connected to an ink source and mounted on a track for motorized operation may be utilized. The printer head may be fully contained within the operational area, but other components may be disposed in other areas of the apparatus 100. The printer head may be in communication with a number of sensors disposed within the operational to aid in calibration, spatial recognition, and accuracy of the printer head for administration of the temporary tattoo.

Embodiments of the present disclosure may comprise methods, systems, and components comprising, but not limited to, at least one of the following:
  A. A Housing 200;
  B. A Visualization Module 300;
  C. A Printer Module 400;
  D. A Barrier 500; and In some embodiments, the present disclosure may provide an additional set of components for further facilitating the system. The additional set of components may comprise, but not be limited to:
  E. A User Interface ("UI") Terminal 600.

Details with regards to each component is provided below. Although components are disclosed with specific functionality, it should be understood that functionality may be shared between components, with some functions split between components, while other functions duplicated by the components. Furthermore, the name of the component should not be construed as limiting upon the functionality of the component. Moreover, each stage disclosed within each component can be considered independently without the context of the other stages within the same component or different components. Each stage may contain language defined in other portions of this specifications. Each stage disclosed for one component may be mixed with the operational stages of another component. In the present disclosure, each stage can be claimed on its own and/or interchangeably with other stages of other components.

The following depicts an example of a method of a plurality of methods that may be performed by at least one of the aforementioned components. Various hardware components may be used at the various stages of operations disclosed with reference to each component. For example, although methods may be described to be performed by a single apparatus, it should be understood that, in some embodiments, different operations may be performed by different apparatuses in operating in conjunction with each other. For example, a temporary tattooing apparatus 100 may be employed in the performance of some or all of the stages disclosed with regard to the methods. Similarly, one apparatus may be employed in the performance of some or all of the stages of the methods. As such, the apparatus may comprise at least one of the architectural components disclosed herein.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, a method may be performed by at least one of the aforementioned components. The method may be embodied as, for example, but not limited to, computer instructions, which when executed, perform the method. The method may comprise the following stages:

selecting a temporary tattoo for administration to an extremity of a user;

inserting the extremity of the user into a cavity of the apparatus via a first opening, at least a portion of the extremity being visible through one or more transparent wall portions of a housing of the apparatus;

transmitting data related to the selected temporary tattoo to a processing module for processing via an AR framework the AR framework comprising the following steps:

providing a plurality of rules and/or directions related to an AR framework to a processing module for facilitating conversion of a digital tattoo image into an AR compatible tattoo digital file, receiving the digital tattoo image in a digital media format, preprocessing the digital tattoo images, performing a detection algorithm to detect visual components of the digital tattoo image, converting the analyzed digital tattoo images into a lattice for visual rendering and overlaying, and converting the resulting lattice with the analyzed tattoo image into AR compatible tattoo digital files, and responsive to receiving the processed selected temporary tattoo data, superimposing, via an AR module integrated into the one or more transparent wall portions 208, the selected temporary tattoo onto the extremity of the user, adjusting placement of the temporary tattoo on the extremity of the user;

confirming administration of the temporary tattoo; and responsive to the confirming, transmitting machine readable instructions to a printer head integrated into the cavity, to print the selected tattoo onto the extremity of the user.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

It is noted that the apparatus is not limited to temporary tattooing and may be used for henna tattooing and/or permanent tattooing. It is further noted that any style of tattoo may be utilized such as, but not limited to, micro tattoos, dot work, blackwork tattoos, realism tattoos, and/or fine-line tattoos.

II. System Configuration

One possible embodiment of a component of the system may be provided by the PaintCo™ suite of products and services provided by PaintCo Labs.

Accordingly, embodiments of the present disclosure provide a software and hardware platform comprised of a distributed set of components, including, but not limited to:

A. Housing 200

As shown in FIGS. 1-6, the apparatus 100 may include a housing 200. The housing 200 may be used to retain, secure, and/or contain components of the apparatus 100. The housing 200 may be further used to provide a rigid structure and/or a working area for operation of the apparatus 100. In some embodiments, the housing 200 may have a cuboid shape, having six relatively planar faces or walls 201. However, those of skill in the art will recognize that other shapes are possible without departing from the scope of the invention. In some embodiments, one or more walls 201 of the housing 200 may include one or more curved surfaces.

The housing 200 may be constructed to enclose a cavity 204. The cavity 204 may be shaped to accommodate a user's extremity, such as an arm, leg, hand, and/or foot. The dimensions and shape of the cavity 204 within the housing 200 may support a range of user extremity sizes. The housing 200 may also include ergonomic features to improve user comfort during the tattooing process. As one non-limiting example, the cavity 204 may include a floor 216 configured to support a user's extremity during the tattooing process.

A first opening 202 may be defined by a first wall 201 at one end of the housing 200. The first opening 202 may serve as an entrance for the user's extremity. A second opening 206 may be defined in a second wall 201 substantially opposed to the first opening 202. In some embodiments, the second opening 206 may allow for egress of the user's extremity. As a non-limiting example, if a user wishes to apply a tattoo on a forearm, the user may place their arm into the cavity 204 via the first opening 202. The user's hand may exit the cavity via the second opening 206 such that the user's forearm is disposed within the cavity. In some embodiments, one or more (e.g., each) of the first opening and the second opening may be selectively opened and closed using a transparent door 208. The transparent door 208 may be slidable between a closed position and an open position. In the closed position, the transparent door 208 may prevent a user from inserting an extremity into the cavity. The transparent door 208 may, when in a closed position, impede or prevent dirt, dust, debris, moisture, and the like from entering the cavity 204. When access to the cavity is needed, the transparent door 208 may be moved along a predefined path to an open position, allowing access to and/or egress from the cavity.

In some embodiments, one or more transparent wall portions 214 may be incorporated into the housing. These transparent portions 214 may permit users to observe the tattooing process. The materials chosen for the housing 200, the transparent wall portions 214, and/or the transparent doors 208 may be selected for durability and user safety. As non-limiting examples, the housing 200 may be formed from plastic, aluminum, steel. The one or more transparent portions 214 and/or the transparent doors 208 may be formed from transparent materials such as (but not limited to) one or more of glass, a glass composite, laminated glass, tempered glass, plastic, thermoplastic, polycarbonate, acrylic, polyethylene terephthalate glycol ("PETG"), and/or any other suitable material.

In further embodiments, the housing 200 may comprise one or more compartments 210. The one or more compartments 210 may be used to house, store, and/or contain various components to the apparatus 100 (e.g., one or more ink cartridges 412, one or more power sources 250, wiring, gears, motors, etc.). Each compartment 210 may be selectively accessible via a corresponding access door 212. The one or more compartments 210 may be disposed on an outer portion of one of the plurality of walls 201. The one or more power sources (e.g., battery) 250 may be operatively connected to any suitable component(s) of the apparatus 100.

In some embodiments, the housing 200 may optionally include a handle disposed near the second opening 206. The handle may provide the user with a location to grip, assisting in both positioning and stabilizing a user's forearm positioned within the cavity. The handle may be adjustable to allow for different arm positions and/or different physical features of the users.

B. Visualization Module 300

In embodiments, the apparatus 100 may include a visualization module 300 The visualization module 300 may include hardware and/or software configured to effect visualization of a tattoo on a user's extremity prior to application of the tattoo. The visualization module 300 may utilize advanced graphical processing capabilities. These capabilities may allow for the rendering of high-resolution images. The rendering may be of such quality that it closely resembles the appearance of a real tattoo on skin. The module may also incorporate color calibration features. These features may ensure that the colors displayed match those of the final tattoo ink. This may be particularly beneficial for accurately previewing tattoos with intricate designs or specific color requirements.

Furthermore, the visualization module 300 may support dynamic scaling functions. These functions may enable one or more portions of the visual media to adjust in size and/or shape. The adjustments may be made in real-time or substantially in real time. In embodiments, the adjustments may be based at least in part on one or more dimensions of the user's extremity. This may help to ensure that the tattoo design fits on the intended area of the skin. The visualization module 300 may offer a 3D visualization option. This option may provide a comprehensive view of how the tattoo would wrap around the contours of the extremity. Such a feature may enhance user satisfaction by offering a realistic preview of the tattoo from various angles.

The visualization module 300 may facilitate the superimposition of tattoo designs onto the user's extremity. The superimposition may be achieved with minimal latency, enhancing the user's experience by providing substantially instantaneous feedback on design adjustments. The visualization module 300 may also be equipped with user-friendly interface options. These options may allow users to interact with and/or modify visual media. Modifications may include (but need not be limited to) resizing, repositioning, adjusting color balance, and/or otherwise changing the design before the design is applied as a tattoo.

In some embodiments, the visualization module 300 may include one or more cameras or sensors 302 configured to capture data related to the user's extremity. For example, the data may include images of the extremity, shape data related to the extremity, color data related to a skin tone of the extremity, and/or any other data related to a user's extremity inserted within the apparatus 100. In some embodiments, the camera 302 may include stereoscopic cameras and/or an array of cameras configured to capture a three-dimensional image of the user's extremity.

The visualization module may include one or more projectors 304. The one or more projectors 304 may be configured to project, onto the extremity of the user, an image representing the tattoo. In embodiment, the projectors may be color-balanced to reflect the actual color of the ink applied in the tattooing process, as it would appear on the user's extremity. The projected image may be modified in real-time or substantially in real time based on user input, adjusting color shape, size, and/or other properties of the image.

In some embodiments, the visualization module 300 may include an augmented reality (AR) module consistent with an embodiment of the disclosure. The AR module may be used to superimpose, overlay, project, and/or map a desired temporary tattoo onto an extremity of a user placed in the cavity 204. The image may be visible to the user via the one or more transparent wall portions 214 and/or the transparent door portions 208. In some embodiments, at least a portion of the AR module may be integrated into the one or more transparent wall portions 214. The AR module may further be in operative communication with the one or more sensors 302 and/or any other component of the apparatus 100.

The AR module may be used in conjunction with and/or in replaced by a light-based projector, mixed reality module, Heads up display ("HUD") technology, and/or a holographic projection means, having at least a portion of the disclosed features of the AR module.

The visualization module 300 (e.g., using the AR module) may be utilized and/or operated via the UI terminal 600, other computing device 700 and/or any other suitable controller to manipulate a desired tattoo and/or stencil allowing for resizing, translation, rotation, and/or any other suitable modification. Any modifications requested and/or made by the user may be processed by the visualization framework for rendering and subsequently projecting onto the user's extremity and/or the transparent portion 214, in accordance with the user's extremity placement in the cavity 204. In other embodiments, resizing, translation, rotation, and/or any other suitable modifications for the projected tattoo may be performed responsive to physical contact directly onto the transparent top portion 208 similar to, for example, but not limited to, a touchscreen. In other embodiments the AR module may be used to be used to superimpose, overlay, project, and/or map a desired temporary tattoo onto an extremity of a user placed in the cavity 204 visible to the user via the one or more screens in the UI terminal 600.

In some embodiments, the visualization module 300 may comprise a visualization framework for operation of the visualization module 300. The visualization framework may comprise a machine vision methodology.

In further embodiments, the visualization module 300 may utilize one or more of projector(s) (e.g., projectors 304), sensor(s), high-definition camera(s) (e.g., cameras 302), light emitter(s), scanners, and the like for mapping the extremity of the user placed inside the cavity 204.

The visualization framework may account for and/or accommodate one or more of dermal features, dermal damage, sub dermal features, skin tone, skin discoloration, visible blood vessels, and the like. As one non-limiting example, the visual framework may automatically modify the image based on a user's skin tone to so that a color of the image is accurate to the sample selected by the user. As another non-limiting example, the visualization framework may adjust a size and/or position of the image to account for dermal damage, such as a scar.

Figure 7:
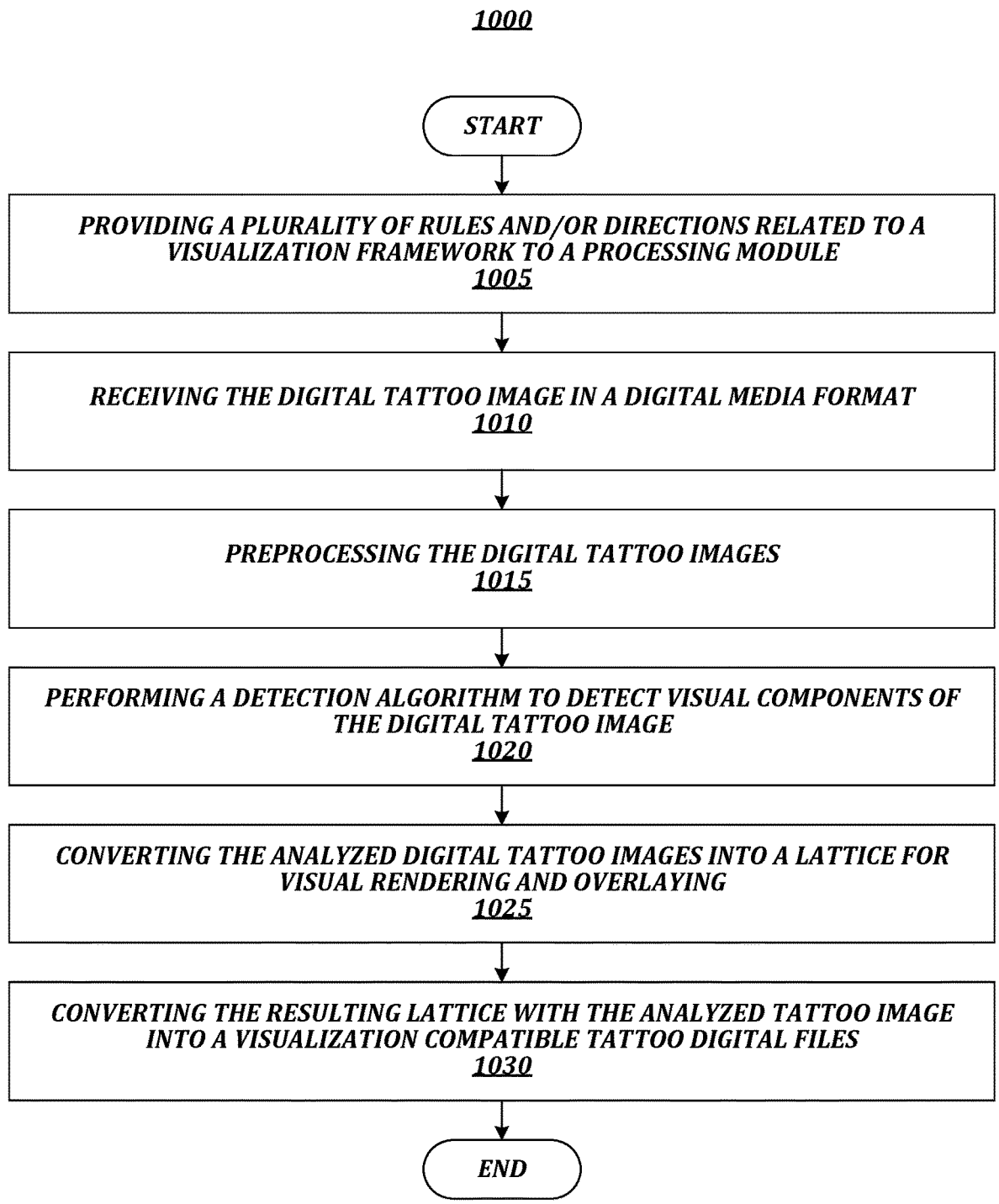
FIG. 7 is a flow chart for a method 1000 for generating AR compatible tattoo digital files.

The visualization framework may comprise a method 1000 for generating compatible tattoo digital files, illustrated at least in FIG. 7. The compatible tattoo digital files may be optimized for automated tattooing, configured for display as visual art, further configured for AR display, and/or converted to or machine-readable instructions for execution (e.g., application) of the tattoo by the printer module 400. The compatible tattoo digital files may be generated via interpreting and/or processing graphical artworks and/or images.

In step 1005, a plurality of rules and/or directions related to the visualization framework may be provided to a processing module to facilitate conversion of a digital tattoo image into an AR compatible tattoo digital file. In some embodiments the artworks, images, and/or tattoos may be preprogrammed into the apparatus 100. Additionally or alternatively, the artworks, images, and/or tattoos may be uploaded for a user device. In still other embodiments, the artworks, images, and/or tattoos may be stored in one or more repositories controlled by and/or independent of the operator of the apparatus. As a specific example, a university may create a repository with one or more tattoo images and allow users to obtain temporary tattoos associated with the university before a sports game or other event.

In step 1010, the processing module may receive the digital tattoo image(s) in one or more digital media formats via any suitable means of receiving consistent with at least a portion of the computing device 700.

In step 1020, a preprocessing algorithm may be applied to the digital tattoo images. Some nonlimiting examples of the preprocessing algorithm are adjustment to one or more of brightness, dynamic range, contrast, light curves, color distribution, and/or enhancement of geometric features. It is noted that other preprocessing procedures may be applied to different parts of the digital tattoo images.

In step 1025, a detection algorithm may be used to detect and/or analyze visual components of the digital tattoo image(s), such as dots, lines, color, line thickness, shaded areas, boundaries, and/or edges of areas. Said analysis may be performed in plurality of stages using a plurality of methodologies such as, but not limited to, line tracing, space filling, geospatial distribution, predictions via machine learning, probabilistic dot placement, half-toning, gradient capabilities, and/or shading. The analysis may improve visual representations and/or projections of images via optimized spatial distribution the digital images.

In step 1030, the analyzed digital tattoo images may be converted into a grid and/or lattice for projection, overlaying, and/or visual rendering. The lattice configuration may be any suitable grid shape and/or distribution. Information encoding and/or spatial variation encoding variations of various data points markers may comprise geolocation, size, omission, shape and/or color, for use for pattern creation thereby allowing identification of local spatial coordinates by the visualization module 300. The pattern(s) may be rule based, predictive, and/or probabilistic. In some embodiment, machine learning and/or artificial intelligence engines may be used to convert the pattern to a grid and/or lattice.

In step 1035, the resulting lattice, combined with the analyzed tattoo image, may be converted into compatible tattoo digital files for projection, storage, AR displaying, and/or overlaying onto the extremity of the user and/or display in an AR fashion via the transparent portion 214. In some embodiments, the user may interact with the lattice, adjusting one or more visual properties thereof. For example, the user may adjust a color, adjust a size of at least a portion of the lattice, scale the entire lattice to adjust image size, rotate the lattice, and/or any other operation to adjust the visual properties of the displayed/projected image.

At least a portion of the data generated, processed, and/or converted may be further processed and/or passed to other components and/or modules of the apparatus 100 to facilitate and/or coordinate operation of the apparatus and components thereof.

C. Printer Module 400

As shown in at least FIGS. 1-6, the apparatus 100 may include a printer module 400 consistent with an embodiment of the disclosure. The printer module 400 may include hardware and/or software configured to apply the tattoo to the extremity of the user. In particular, the printer module 400 may be used to print a temporary tattoo on a predetermined area of an extremity of a user, where at least the predetermined portion of the extremity is placed in the cavity 204. Some or all of the printer module 400 may be disposed and/or secured in the cavity 204.

Consistent with embodiments of the present disclosure, the printer module 400 may include one or more print heads 402. At least one (e.g., each) of the print heads may administer temporary tattoo ink. An ink cartridge may be operatively connected to the print head 402 (e.g., via one or more tubes). The ink cartridge may provide temporary tattoo ink to the printer head.

One or more motors 410 may be part of the printer module 400. A track and rail system (gantry) 404 may be included. The gantry 404 may be used to adjust placement of the print heads 402 in three dimensional space. The system may facilitate administration of ink. The administration of ink may be via the printer head(s) 402. The administration may occur within a predetermined operational area (e.g., in the cavity 204, a subset of the cavity area, etc.). The gantry 404 and motor 410 may allow precise movement of the printer head in three dimensional space. Such movement may be across multiple axes. Precision in movement may enable accurate ink application.

The printer module 400 and the one or more print heads 402 may support various ink types. These types may include standard colors, metallic shades, and UV-reactive inks. The inclusion of different ink types may enhance the versatility of the temporary tattooing apparatus.

In some embodiments, the printer module may comprise the one or more print heads 402. As shown in FIGS. 1-6 the printer module 400 includes a first print head 402*a* and a second print head 402*b*. However, those of skill in the art will recognize that it is possible to include more or fewer print heads without departing from the scope of the invention. One or more (e.g., each) print head 402 may be the means for administration of the tattoo and/or temporary tattoo. For example, the print head 402 may comprise an adjustable print swatch width dependent on the shape of the detected and/or predicted surface the print head 402 is administering ink on. By way of nonlimiting example, the print swath width may be wider for ink administration on flat surfaces and narrower for ink administration on curved surfaces. The print head 402 may further comprise a throw distance limit (i.e., a geospatial distance) for proper administration of ink onto the surface.

Figure 6:
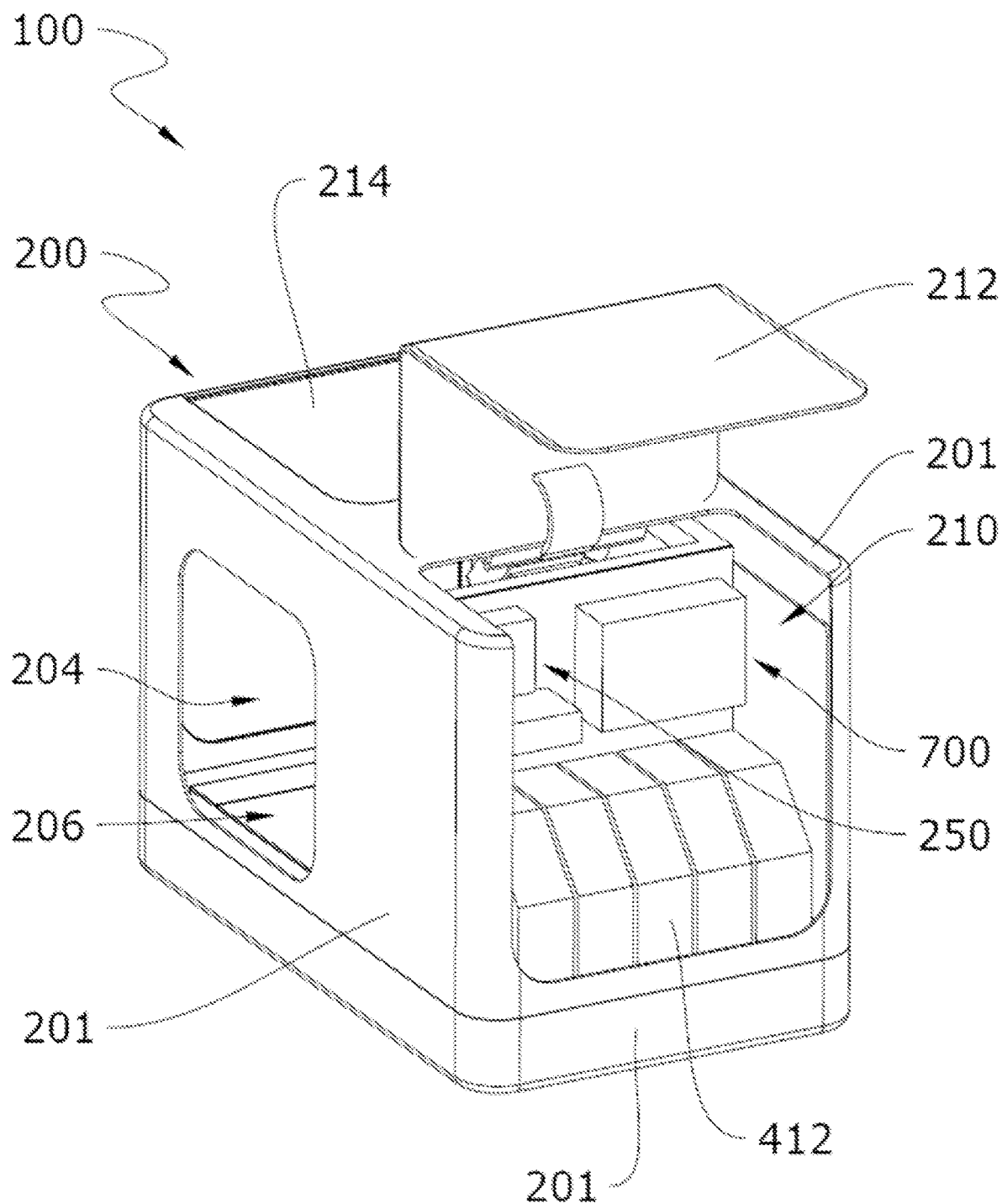
FIG. 6 illustrates another perspective view thereof, showing the contents of an example compartment in the housing.

For administration of temporary tattoos, each printer head 402 may comprise one or more nozzles (not shown). The one or more nozzles may be used to spray temporary tattoo ink onto a surface at a predetermined rate dependent on movement of the associated print head 402. The one or more nozzles may be embodied as one or more generally tubular elements secured on one end to one or more ink cartridges 412 and/or one or more tubing and/or piping lines secured to the one or more ink cartridges 412. As shown in FIG. 6, there are 5 ink cartridges 412, corresponding to cyan, magenta, yellow, black (key), and white ink, similar to CMYK printers. However, those of skill in the art will recognize that more, fewer, or different ink cartridges may be used. In addition, different types of ink may be used without departing from the scope of the invention. For example, UV-reactive inks, UV-curing inks, metallic inks, and/or any other temporary tattoo ink may be stored in the ink cartridges 412 for application via the print heads 402. The one or more nozzles may be embodied as one or more tubular elements having an opening and/or aperture on another end for administration of the temporary tattoo ink onto an incident surface. In some embodiments, the one or more nozzles may be in operative communication with one or more print head sensors for calibration, spatial recognition, and administration purposes.

In instances where permanent and/or semi-permanent tattoos are administered, each print head 402 may house a tattoo needle. The tattoo needle may be used as the contact point for administration of ink to the skin of the user. The tattoo needle may be secured to a needle spring and/or plunger. For temporary tattoo embodiments, the print head 402 may include a print head body (not shown), a print head tip (not shown), and a print head housing (not shown).

One or more (e.g., each) print head 402 may house a printer head sensor. The printer head sensor may be for calibration, geospatial recognition, acceleration control, pressure and/or contact detection, quality control, and/or any other suitable purpose.

In other embodiments, print head 402 may be embodied as or otherwise include one or more of a variety of types of cartridges such as, but not limited to, third party cartridges, custom cartridges and/or any other cartridge capable of operation with the present disclosure.

The printer module 400 may include a gantry 404. The gantry 404 may be used to support the one or more print heads 402 and allow for movement of the print heads in three-dimensional space. As shown in the present Figures, the gantry 404 includes a vertical support 406 and a horizontal support 408. However, those of skill in the art will recognize that other gantry types are possible.

The vertical support 406 extends generally upward from the floor 216 into the cavity 204. The vertical support is movably mounted, such that the support can translate (move) in a direction parallel to the user's extremity, along an axis between the first opening and the second opening. One or more motors may be used to move the vertical support.

The horizontal support 408 may be movably attached to the vertical support 406. The horizontal support 408 may extend substantially horizontally from the vertical support, in a direction orthogonal to the direction of movement of the vertical support 406. In embodiments, the horizontal support 408 may be configured to translate (move) up and down along the vertical support 406. One or more motors may be used to move the vertical support.

Figure 3:
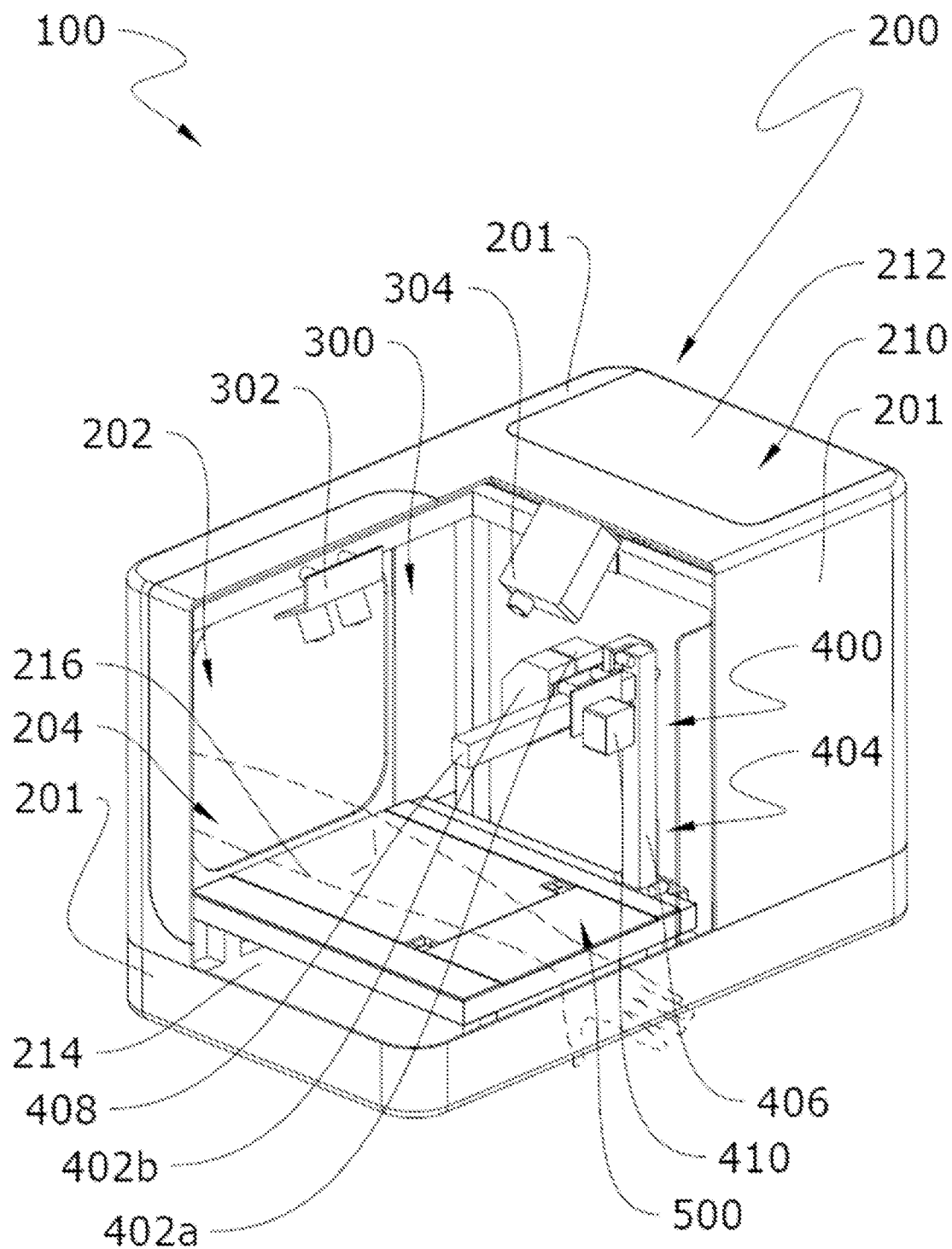
FIG. 3 illustrates a partial cutaway rear perspective view of the temporary tattooing apparatus, showing a user's extremity inserted therethrough.
Figure 4:
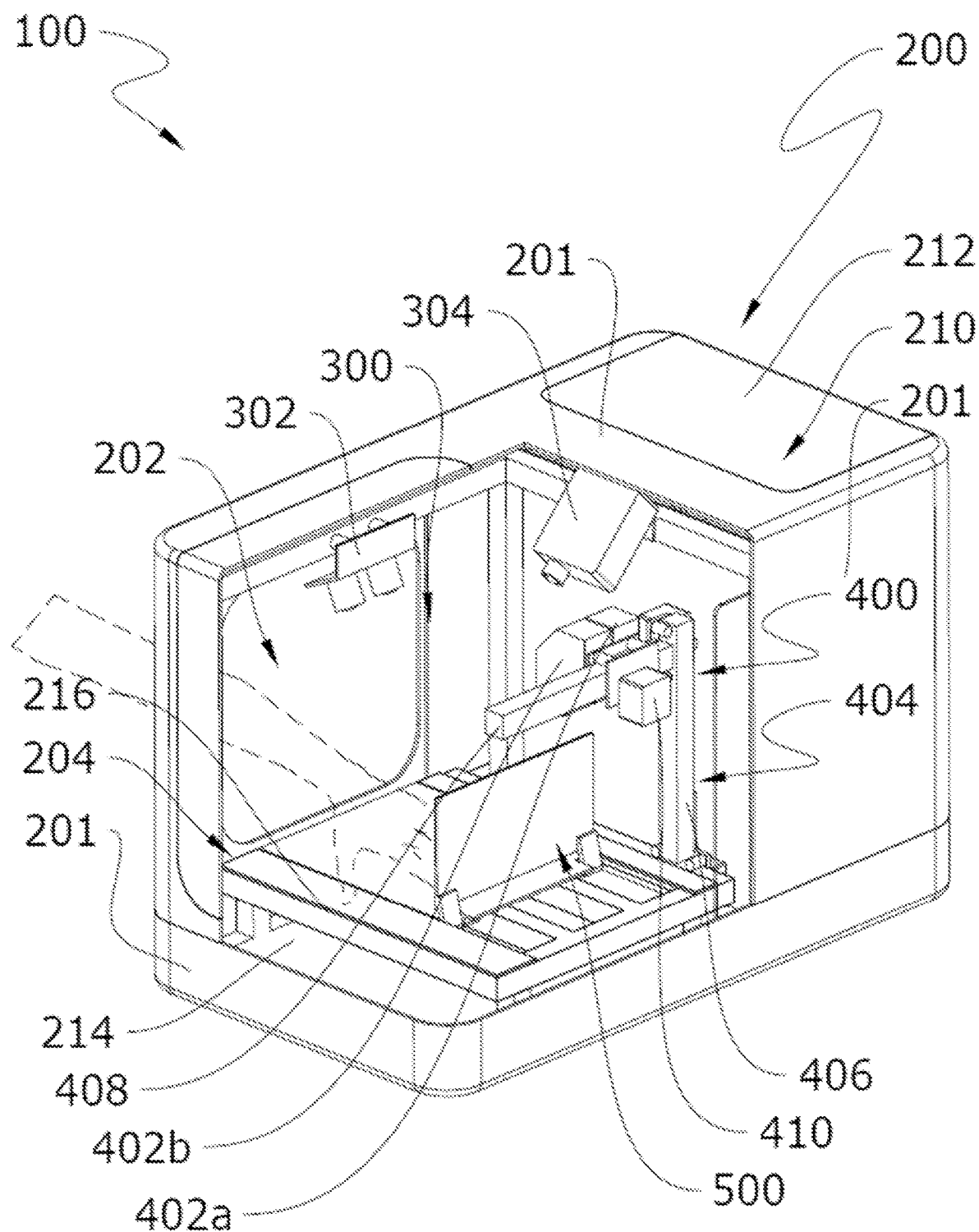
FIG. 4 illustrates a partial cutaway rear perspective view of the temporary tattooing apparatus, showing a user's extremity inserted therein, with a barrier device in a raised position.
Figure 5:
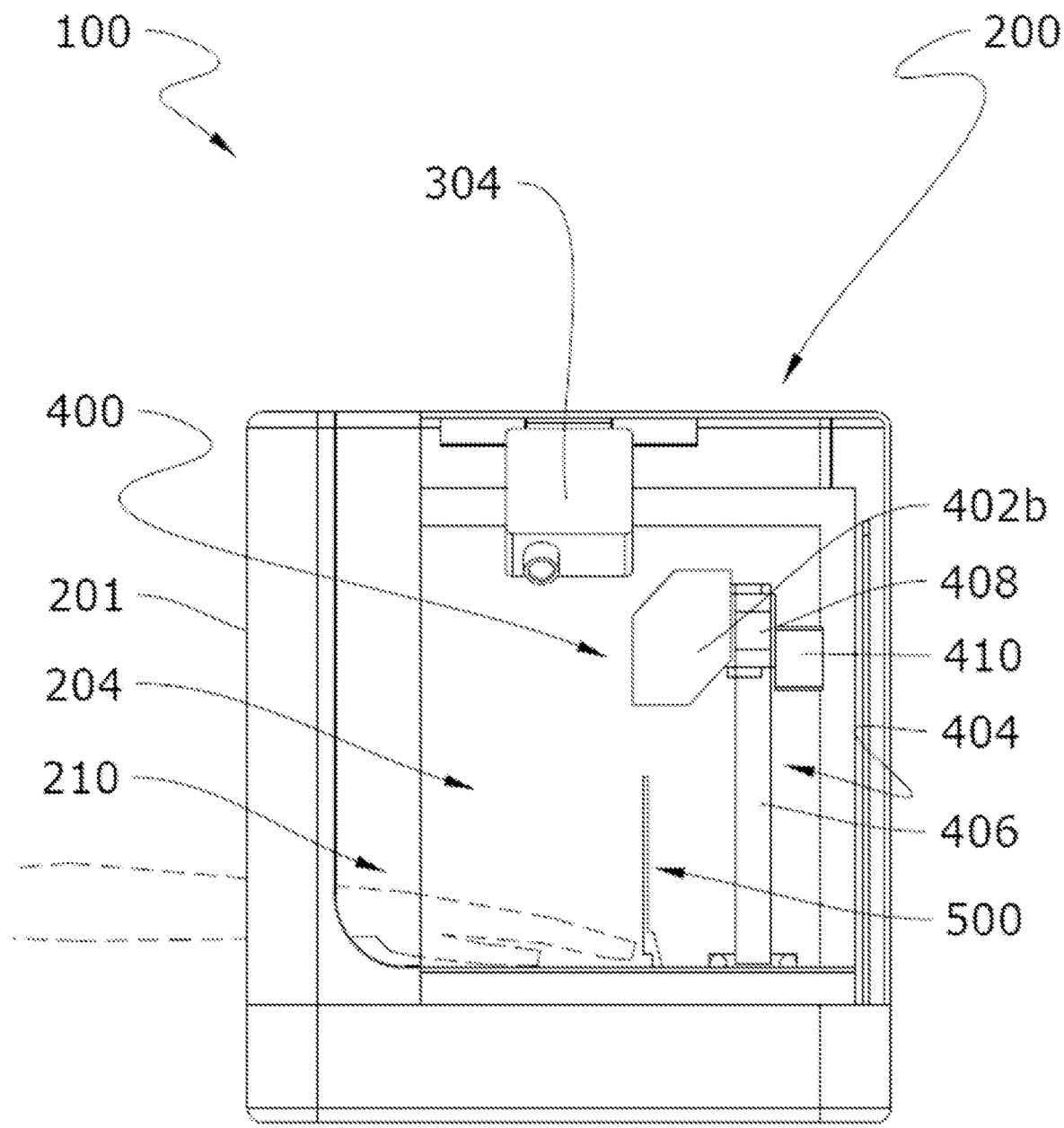
FIG. 5 illustrates a side view embodiment of the apparatus 100 with the user's extremity inserted therein, and with the barrier in the raised position.

The one or more print heads 402 may be movably attached to the horizontal support 408. In some embodiments, each of the one or more print heads 402 may be mounted to the horizontal support 408 such that the print heads move as a single unit. In other embodiments, each print head (e.g., 402a and 402b, as shown in FIGS. 3-4) may be independently movable along the horizontal support 408. A motor 410 may be used to move the one or more print heads along the horizontal support 408.

In further embodiments, the printer module may comprise the one or more ink cartridges 412. The one or more ink cartridges 412 may be installed as a removable component for providing ink to the tattooing apparatus 100, the one or more print heads 402, and/or a needle cartridge housing a tattoo needle. The one or more ink cartridges 412 may be configured to allocate ink via tubing, piping, capillary action, and/or pump mechanisms at predetermined intervals. In some embodiments, the one or more ink cartridges 412 may be embodied as a plurality of ink bags each housing an ink color (e.g., white(s), cyan, magenta, yellow, black), with each of the ink bags including an internal pressing mechanism to ensure consistent ink administration. AS discussed above, while FIG. 6 shows five ink cartridges 412, more or fewer cartridges may be included in the apparatus 100 without departing from the scope of the invention.

To facilitate operation and/movement of the one or more print heads 402 and/or a needle cartridge, the printer module 400 may comprise any suitable combination of motors (e.g., drive motors, stepper motors, brushed direct current motors, BLDC motors), gantry devices and/or systems, track sensors (e.g., accelerometers, mapping sensors, optical sensors, and/or any other sensor disclosed in the present disclosure) linear slides, tracks, and/or rails (e.g., X-axis guide rail(s) and/or Y-axis guide rail(s)).

In some embodiments, a plurality of other sensors may be integrated into and/or in operative communication with, at least a portion of the components in the printer module 400. Some nonlimiting examples of the plurality of other sensors may include, but are not limited to, for example, gyroscopes, accelerometers, optical sensors, contact sensors, sensors configured to output signals associated with needle depth or position, pressure sensors, impedance sensors, galvanic sensors, and/or any other suitable sensor.

D. Barrier 500

In embodiments, the apparatus 100 may include a barrier 500. The barrier may be configured to partition the volume defined by the cavity to aid in placement of the user's extremity within the cavity. For example, the user's hand may not require the entire volume of the cavity; the barrier 500 may be used to restrict the hand to a particular portion of the cavity. At least FIGS. 1-6 illustrates the barrier 500 consistent with an embodiment of the disclosure. The barrier 500 may be used to section off and/or divide a portion of the cavity such that the workspace and/or operational area of the cavity 204 is reduced to a predetermined area. The barrier 500 may be hingedly secured to the floor 214 of the cavity 204. In other embodiments, the barrier 500 may be secured to one of the plurality of inner walls and have retractably expandable capabilities. In yet other embodiments, at least a portion of the barrier 500 may be housed within the housing 200.

In some embodiments, the barrier 500 may automatically adjust in response to the dimensions of the user's extremity detected by the one or more sensors. The one or more sensors may detect the size and shape of the user's extremity. The detected information may communicate with one or more motors. The one or more motors may adjust a position of the barrier 500 based at least in part on the detected extremity shape and/or size. As one example, a stepper motor may provide precise control over the barrier movement. This control may accommodate different extremity sizes. In some embodiments, the barrier 500 may be constructed from a material that is transparent or semi-transparent. This allows the user to view the tattooing process through the barrier 500. A soft, skin-friendly material may line the barrier 500. This material may provide comfort to the user's extremity during the tattooing process. An emergency release feature may be equipped on the barrier 500. This feature may allow for quick retraction in case of user discomfort or safety concerns. The barrier may be movable between a retracted (open) position and an extended (closed) position. In some embodiments, the barrier 500 may be adjustable to one or more positions between the extended and retracted position. For example, a position of the barrier 500 may be adjusted via a programmable logic controller (PLC). This PLC may be part of the apparatus's computing device 700. End-of-travel sensors may be included in the barrier mechanism. These sensors may help to prevent over-extension or over-retraction during adjustment. The motorized adjustment features of the barrier 500 may be synchronized with the visualization module 300. This synchronization may ensure the projected tattoo design aligns with the modified operational area.

The barrier 500 may have an open position and a closed position. In the open position, the barrier may be oriented flush against an inner wall of the cavity 204 operative to minimize obstruction of the operational area within the cavity 204. In the closed position, the barrier may be in contact with and/or removably secured to two or more inner walls of the cavity 204 operative to split the cavity 204 into two separate cavities divided via the barrier 500. The closed position may be used to allow only a portion (e.g., a hand) of an extremity of the user to be housed within the cavity 204.

Transitioning from an open position to a closed position and vice versa, the barrier 500 may swing an arcuate fashion and/or expand and contract in size and length.

E. UI Terminal 600

As shown in FIG. 1, the apparatus 100 may include a UI terminal 600 operatively connected thereto. The UI terminal 600 may be, for example, a tablet computer, smartphone, laptop computer, thin client, and/or other computing device 700 consistent with an embodiment of the disclosure. While FIG. 1 shows the UI terminal 600 as a separate device, it is noted that the UI terminal could be formed integrally with the apparatus 100. For example, the UI terminal 600 could be integrated into the housing 200 of the apparatus 100. The UI terminal 600 may be used for a user of the apparatus 100 to perform operational commands to the apparatus 100 including, but not limited to, for example:

a. selecting a temporary tattoo and/or stencil for administration,
b. customizing properties (e.g., size, shape, orientation, overall look) of a temporary tattoo for administration,
c. performing payment operations relating to the temporary tattoo,
d. determining placement of the temporary tattoo on the extremity of the user,
e. specifying a length of session,
f. determining resolution quality,
g. determining the extremity utilized (e.g., hand, foot, forearm, calf, etc.) for administration of the temporary tattoo,
h. confirming administration of the temporary tattoo.

In some embodiments, the UI terminal 600 may comprise an input device used to receive a user input to request performance of at least any of the aforementioned commands. The input device may be embodied as, but not limited to, for example, a Graphical User Interface ("GUI"), a screen, a touchscreen, a display, a plurality of buttons, and/or any device capable of displaying and/or receiving input.

An input, received from the user via a selection on the input device, may be accepted by an input module. The input module may communicate the information, selections, and/or data (collectively, "input data") related to the input to one or more other components of the apparatus 100 for further processing.

The input data may be passed to one or more storage devices. The one or more storage devices may be configured to store, organize, receive, and/or transmit data, internal and external variables, settings (e.g., machine settings, user data, puncture settings, preprogrammed templates), puncture parameters, dot scores, experimental data, tattoo graphical data, artwork, stenciling designs, tattoo designs, and operation commands, operation activities. The one or more storage devices may be consistent with at least a portion of the described computing device 700.

A processing module may be in operative communication with the input device and/or the one or more storage devices. The processing module may be configured to generate control variables for output to the printer module 400 based on data from the one or more storage devices, image data, sensor data, and/or preprogrammed commands stored and/or retrieved from any of the aforementioned sensors and/or other data sources.

The processing module may communicate processed data and/or a plurality of commands to at output module. The output module may be used to communicate and/or transmit operational instructions to various components of the apparatus 100. The operational instructions may be transmitted and/or received via components of one or more computing devices 700 connected to each module of the apparatus 100 and/or via transmitters, receivers, wireless networks, and the like.

III. Apparatus/System Use

Embodiments of the present disclosure provide a system operative by a set of methods comprising instructions configured to operate the aforementioned components in accordance with the methods. The following depicts an example of a method of a plurality of methods that may be performed by at least one of the aforementioned components. Various hardware components may be used at the various stages of operations disclosed with reference to each component.

For example, although methods may be described to be performed by a single component, it should be understood that, in some embodiments, different operations may be performed by different components in operative relation with one another. For example, an apparatus may be employed in the performance of some or all of the stages disclosed with regard to the methods. As such, the apparatus may comprise at least one architectural component disclosed herein.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Figure 8:
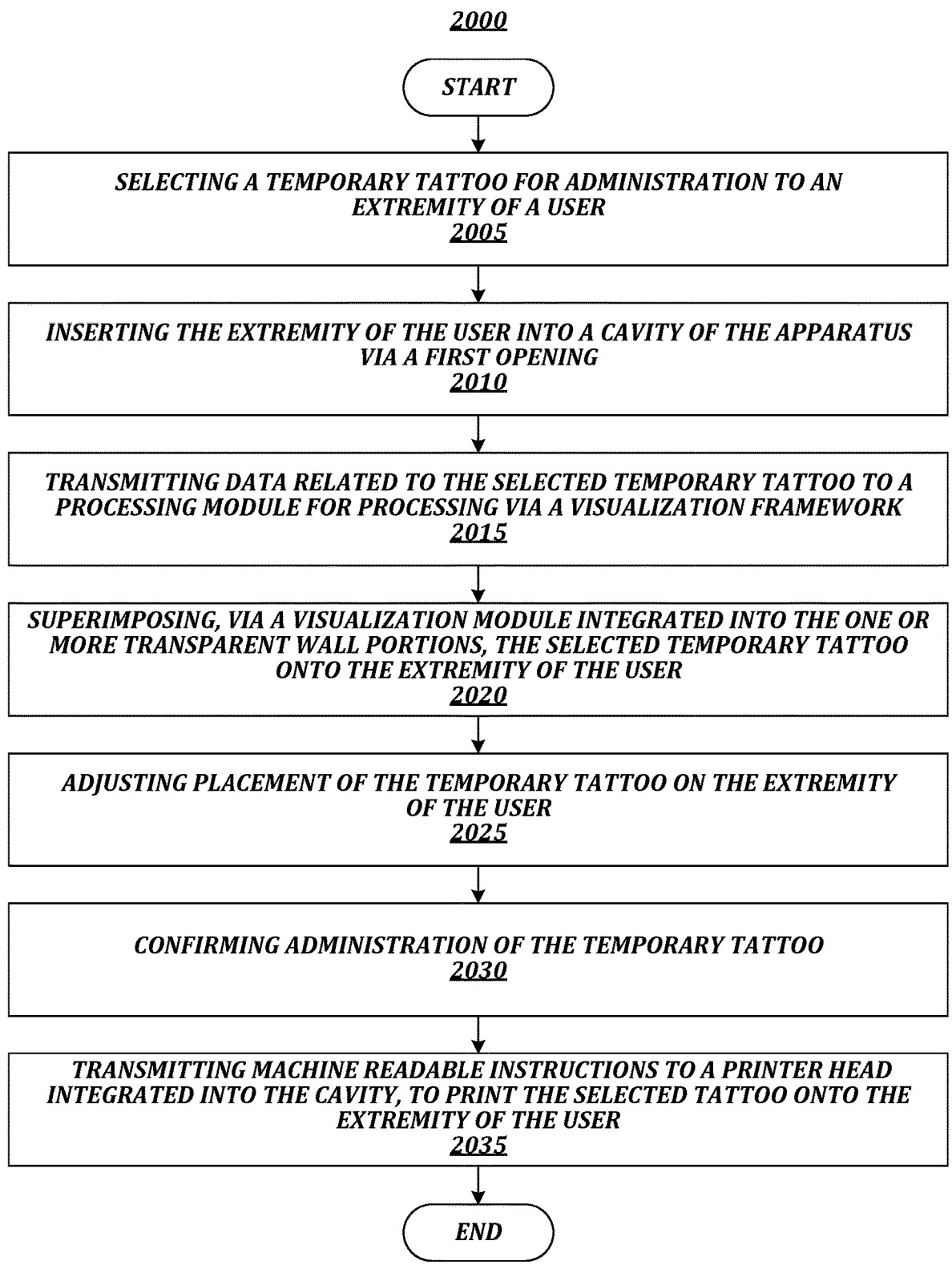
FIG. 8 is a flow chart for a method 2000 for providing a temporary tattoo.

Consistent with embodiments of the present disclosure, a method 1000 for providing a temporary tattoo may be performed by at least one of the aforementioned components, illustrated at least in FIG. 8. The method 2000 may be embodied as, for example, but not limited to, computer instructions, which when executed, perform the method 2000. The method 2000 may comprise the following stages:
1. 2005—selecting a temporary tattoo for administration to an extremity of a user;
2. 2010—inserting the extremity of the user into a cavity 204 of the apparatus 100 via a first opening 202,
   a. At least a portion of the extremity being visible through one or more transparent wall portions 214, 208 of a housing 200 of the apparatus;
3. 2015—transmitting data related to the selected temporary tattoo to a processing module for processing via a visualization framework;
4. 2020—responsive to receiving the processed selected temporary tattoo data, superimposing, via visualization module 300, the selected temporary tattoo onto the extremity of the user;
5. 2025—adjusting placement of the temporary tattoo on the extremity of the user;
6. 2030—confirming administration of the temporary tattoo; and
7. 2035—responsive to the confirming, transmitting machine readable instructions to a printer module 400 integrated into the cavity, to print the selected tattoo onto the extremity of the user.

Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

IV. Computing Device Architecture

Embodiments of the present disclosure provide a hardware and software platform operative as a distributed system of modules and computing elements.

Components of the apparatus 100 may be embodied as, for example, but not be limited to, a website, a web application, a desktop application, backend application, and a mobile application compatible with a computing device 700. The computing device 700 may comprise, but not be limited to the following:

Mobile computing devices, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

Platform 100 may be hosted on a centralized server or a cloud computing service. Although method 1000 has been described to be performed by a computing device 700, it should be understood that, in some embodiments, different operations may be performed by a plurality of the computing devices 700 in operative communication at least one network.

Embodiments of the present disclosure may comprise a system having a central processing unit (CPU) 720, a bus 730, a memory unit 740, a power supply unit (PSU) 750, and one or more Input/Output (I/O) units. The CPU 720 coupled to the memory unit 740 and the plurality of I/O units 760 via the bus 730, all of which are powered by the PSU 750. It should be understood that, in some embodiments, each disclosed unit may actually be a plurality of such units for the purposes of redundancy, high availability, and/or performance. The combination of the presently disclosed units is configured to perform the stages any method disclosed herein.

Figure 9:
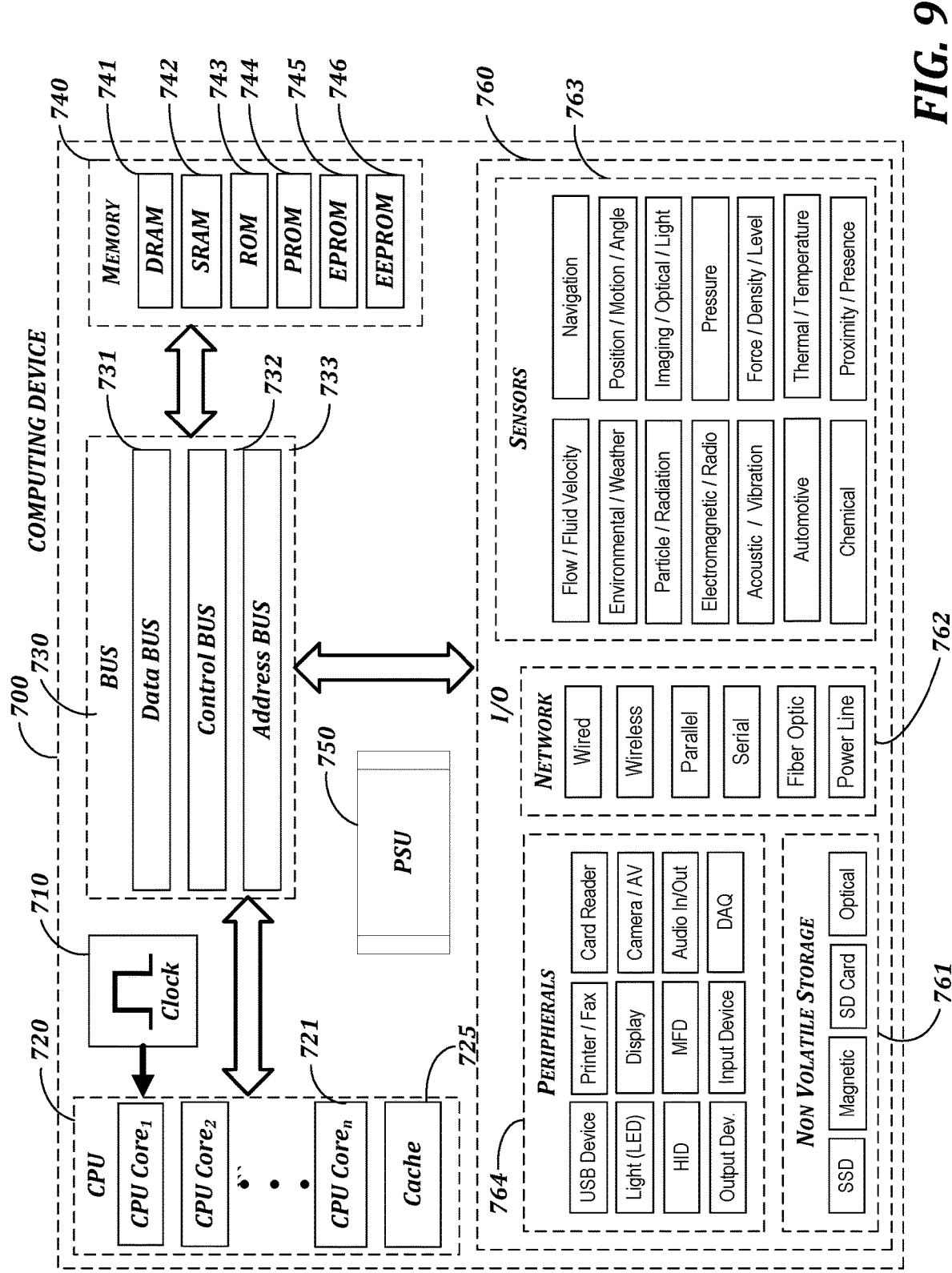
FIG. 9 illustrates block diagram of a computing device 700 associated with the apparatus 100.

FIG. 9 is a block diagram of a system including computing device 700. Consistent with an embodiment of the disclosure, the aforementioned CPU 720, the bus 730, the memory unit 740, a PSU 750, and the plurality of I/O units 760 may be implemented in a computing device, such as computing device 700 of FIG. 9. Any suitable combination of hardware, software, or firmware may be used to implement the aforementioned units. For example, the CPU 720, the bus 730, and the memory unit 740 may be implemented with computing device 700 or any of other computing devices 700, in combination with computing device 700. The aforementioned system, device, and components are examples and other systems, devices, and components may comprise the aforementioned CPU 720, the bus 730, the memory unit 740, consistent with embodiments of the disclosure.

At least one computing device 700 may be embodied as and/or associated with any of the computing elements illustrated in all of the attached figures, including the method 1000, method 2000, the housing 200, the AR module 300, the printer module 400, barrier 500, and/or the UI terminal 600. A computing device 700 does not need to be electronic, nor even have a CPU 720, nor bus 730, nor memory unit 740. The definition of the computing device 700 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 700, especially if the processing is purposeful.

With reference to FIG. 9, a system consistent with an embodiment of the disclosure may include a computing device, such as computing device 700. In a basic configuration, computing device 700 may include at least one clock module 710, at least one CPU 720, at least one bus 730, and at least one memory unit 740, at least one PSU 750, and at least one I/O 760 module, wherein I/O module may be comprised of, but not limited to a non-volatile storage sub-module 761, a communication sub-module 762, a sensors sub-module 763, and a peripherals sub-module 764.

A system consistent with an embodiment of the disclosure the computing device 700 may include the clock module 710 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 720, the central component of modern computers, which relies on a clock. The only exceptions are asynchronous circuits such as asynchronous CPUs. The clock 710 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 700 use a "clock multiplier" which multiplies a lower frequency external clock to the appropriate clock rate of the CPU 720. This allows the CPU 720 to operate at a much higher frequency than the rest of the computer, which affords performance gains in situations where the CPU 720 does not need to wait on an external factor (like memory 740 or input/output 760). Some embodiments of the clock 710 may include dynamic frequency change, where, the time between clock edges can vary widely from one edge to the next and back again.

A system consistent with an embodiment of the disclosure the computing device 700 may include the CPU unit 720 comprising at least one CPU Core 721. A plurality of CPU cores 721 may comprise identical CPU cores 721, such as, but not limited to, homogeneous multi-core systems. It is also possible for the plurality of CPU cores 721 to comprise different CPU cores 721, such as, but not limited to, heterogeneous multi-core systems, big.LITTLE systems and some AMD accelerated processing units (APU). The CPU unit 720 reads and executes program instructions which may be used across many application domains, for example, but not limited to, general purpose computing, embedded computing, network computing, digital signal processing (DSP), and graphics processing (GPU). The CPU unit 720 may run multiple instructions on separate CPU cores 721 at the same time. The CPU unit 720 may be integrated into at least one of a single integrated circuit die and multiple dies in a single chip package. The single integrated circuit die and multiple dies in a single chip package may contain a plurality of other aspects of the computing device 700, for example, but not limited to, the clock 710, the CPU 720, the bus 730, the memory 740, and I/O 760.

The CPU unit 720 may contain cache 722 such as, but not limited to, a level 1 cache, level 2 cache, level 3 cache or combination thereof. The aforementioned cache 722 may or may not be shared amongst a plurality of CPU cores 721. The cache 722 sharing comprises at least one of message passing and inter-core communication methods may be used for the at least one CPU Core 721 to communicate with the cache 722. The inter-core communication methods may comprise, but not limited to, bus, ring, two-dimensional mesh, and crossbar. The aforementioned CPU unit 720 may employ symmetric multiprocessing (SMP) design.

The plurality of the aforementioned CPU cores 721 may comprise soft microprocessor cores on a single field programmable gate array (FPGA), such as semiconductor intellectual property cores (IP Core). The plurality of CPU cores 721 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 721, for example, but not limited to Instruction-level parallelism (ILP) such as, but not limited to, super-scalar pipelining, and Thread-level parallelism (TLP).

Consistent with the embodiments of the present disclosure, the aforementioned computing device 700 may employ a communication system that transfers data between components inside the aforementioned computing device 700, and/or the plurality of computing devices 700. The aforementioned communication system will be known to a person having ordinary skill in the art as a bus 730. The bus 730 may embody internal and/or external plurality of hardware and software components, for example, but not limited to a wire, optical fiber, communication protocols, and any physical arrangement that provides the same logical function as a parallel electrical bus. The bus 730 may comprise at least one of, but not limited to a parallel bus, wherein the parallel bus carry data words in parallel on multiple wires, and a serial bus, wherein the serial bus carry data in bit-serial form. The bus 730 may embody a plurality of topologies, for example, but not limited to, a multidrop/electrical parallel topology, a daisy chain topology, and a connected by switched hubs, such as USB bus. The bus 730 may comprise a plurality of embodiments, for example, but not limited to:

Internal data bus (data bus) 731/Memory bus
Control bus 732
Address bus 733
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand RapidIO Mobile Industry Processor Interface (MIPI)

Coherent Processor Interface (CAPI)

Plug-n-play

1-Wire

Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal 10, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).

Music Instrument Digital Interface (MIDI)

Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 700 may employ hardware integrated circuits that store information for immediate use in the computing device 700, know to the person having ordinary skill in the art as primary storage or memory 740. The memory 740 operates at high speed, distinguishing it from the non-volatile storage sub-module 761, which may be referred to as secondary or tertiary storage, which provides slow-to-access information but offers higher capacities at lower cost. The contents contained in memory 740, may be transferred to secondary storage via techniques such as, but not limited to, virtual memory and swap. The memory 740 may be associated with addressable semiconductor memory, such as integrated circuits consisting of silicon-based transistors, used for example as primary storage but also other purposes in the computing device 700. The memory 740 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 741, Static Random-Access Memory (SRAM) 742, CPU Cache memory 725, Advanced Random-Access Memory (A-RAM), and other types of primary storage such as Random-Access Memory (RAM).

Non-volatile memory which can retain stored information even after power is removed, for example, but not limited to, Read-Only Memory (ROM) 743, Programmable ROM (PROM) 744, Erasable PROM (EPROM) 745, Electrically Erasable PROM (EEPROM) 746 (e.g., flash memory and Electrically Alterable PROM [EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 700 may employ the communication system between an information processing system, such as the computing device 700, and the outside world, for example, but not limited to, human, environment, and another computing device 700. The aforementioned communication system will be known to a person having ordinary skill in the art as I/O 760. The I/O module 760 regulates a plurality of inputs and outputs with regard to the computing device 700, wherein the inputs are a plurality of signals and data received by the computing device 700, and the outputs are the plurality of signals and data sent from the computing device 700. The I/O module 760 interfaces a plurality of hardware, such as, but not limited to, non-volatile storage 761, communication devices 762, sensors 763, and peripherals 764. The plurality of hardware is used by the at least one of, but not limited to, human, environment, and another computing device 700 to communicate with the present computing device 700. The I/O module 760 may comprise a plurality of forms, for example, but not limited to channel I/O, port mapped I/O, asynchronous I/O, and Direct Memory Access (DMA).

Consistent with the embodiments of the present disclosure, the aforementioned computing device 700 may employ the non-volatile storage sub-module 761, which may be referred to by a person having ordinary skill in the art as one of secondary storage, external memory, tertiary storage, off-line storage, and auxiliary storage. The non-volatile storage sub-module 761 may not be accessed directly by the CPU 720 without using intermediate area in the memory 740. The non-volatile storage sub-module 761 does not lose data when power is removed and may be two orders of magnitude less costly than storage used in memory module, at the expense of speed and latency. The non-volatile storage sub-module 761 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (761) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 700 may employ the communication sub-module 762 as a subset of the I/O 760, which may be referred to by a person having ordinary skill in the art as at least one of, but not limited to, computer network, data network, and network. The network allows computing devices 700 to exchange data using connections, which may be known to a person having ordinary skill in the art as data links, between network nodes. The nodes comprise network computer devices 700 that originate, route, and terminate data. The nodes are identified by network addresses and can include a plurality of hosts consistent with the embodiments of a computing device 700. The aforementioned embodiments include, but not limited to personal computers, phones, servers, drones, and networking devices such as, but not limited to, hubs, switches, routers, modems, and firewalls.

Two nodes can be said are networked together, when one computing device 700 is able to exchange information with the other computing device 700, whether or not they have a direct connection with each other. The communication sub-module 762 supports a plurality of applications and services, such as, but not limited to World Wide Web (WWW), digital video and audio, shared use of application and storage computing devices 700, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 762 may comprise a plurality of size, topology, traffic control mechanism and organizational intent. The communication sub-module 762 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G,4G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 700 may employ the sensors sub-module 763 as a subset of the I/O 760. The sensors sub-module 763 comprises at least one of the devices, modules, and subsystems whose purpose is to detect events or changes in its environment and send the information to the computing device 700. Sensors are sensitive to the measured property, are not sensitive to any property not measured, but may be encountered in its application, and do not significantly influence the measured property. The sensors sub-module 763 may comprise a plurality of digital devices and analog devices, wherein if an analog device is used, an Analog to Digital (A-to-D) converter must be employed to interface the said device with the computing device 700. The sensors may be subject to a plurality of deviations that limit sensor accuracy. The sensors sub-module 763 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (O2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 700 may employ the peripherals sub-module 762 as a subset of the I/O 760. The peripheral sub-module 764 comprises ancillary devices uses to put information into and get information out of the computing device 700. There are 3 categories of devices comprising the peripheral sub-module 764, which exist based on their relationship with the computing device 700, input devices, output devices, and input/output devices. Input devices send at least one of data and instructions to the computing device 700. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 700. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 764:

Input Devices
  Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 700. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 700 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data Acquisition (DAQ) devices convert at least one of analog signals and physical parameters to digital values for processing by the computing device 700. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 762 sub-module), data storage device (non-volatile storage 761), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A temporary tattooing apparatus comprising:
   a housing defining a first opening, a second opening, and a cavity connecting the first opening to the second opening, the cavity being designed to receive a user's extremity through the first opening and to allow egress through the second opening;
   a visualization module configured to superimpose visual media equivalent to a desired tattoo onto the user's extremity within the cavity;
   a barrier movable between a closed position and an open position, wherein the barrier in the closed position, prevents a user from accessing a portion of the cavity, and wherein the barrier is configured to move between the closed position and the open position based on a selected extremity to be tattooed;
   a printer module disposed within the cavity to apply the desired tattoo, the printer module including one or more print heads for administering temporary tattoo ink to apply the temporary tattoo to the user's extremity; and
   a user interface terminal configured to allow a user to select the temporary tattoo from among a number of candidate temporary tattoos and to adjust one or more properties of the temporary tattoo prior to application of the temporary tattoo.

2. The temporary tattooing apparatus of claim 1, wherein the selected extremity to be tattooed comprises one of: a hand, a forearm, a foot, or a leg, and wherein the user select the extremity to be tattooed using the user interface terminal.

3. The temporary tattooing apparatus of claim 1, wherein the barrier includes a sensor array to detect the size and shape of the user's extremity and to communicate with a motor system to adjust the barrier's position accordingly.

4. The temporary tattooing apparatus of claim 1, wherein at least a portion of the housing is formed from a transparent material.

5. The temporary tattooing apparatus of claim 4, wherein the visualization module comprises:
   one or more sensors configured to detect a size, shape, and location of the user's extremity within the cavity, and
   a projector configured to project the visual media equivalent to the desired tattoo onto the user's extremity.

6. The temporary tattooing apparatus of claim 5, wherein at least one of the one or more sensors is configured to determine a skin tone of the user, and wherein the apparatus is configured to adjust one or more color properties of the desired tattoo based on the determined skin tone.

7. The temporary tattooing apparatus of claim 5, wherein at least one of the one or more sensors is configured to determine a size of the extremity to be tattooed, and wherein the apparatus is configured to adjust a size of at least a portion of the desired tattoo based on the determined size.

8. The temporary tattooing apparatus of claim 5, wherein the visual media equivalent to the desired tattoo is adjusted in real time, responsive to the user adjusting the one or more properties of the temporary tattoo using the user interface terminal.

9. The temporary tattooing apparatus of claim 1, wherein the printer module further comprises a gantry configured to support the one or more print heads and to move the one or more print heads throughout the cavity to administer the temporary tattoo ink.

10. The temporary tattooing apparatus of claim 9, wherein the printer module comprises a plurality of print heads, and wherein at least one of the plurality of print heads is configured to apply white temporary tattoo ink.

11. The temporary tattooing apparatus of claim 1, wherein the user interface terminal comprises a tablet computing device.

12. The temporary tattooing apparatus of claim 1, further comprising:
a first door configured to selective cover the first opening, and
a second door configured to selectively cover the second opening.

13. A temporary tattooing apparatus comprising:
a housing defining a first opening a second opening and a cavity connecting the first opening to the second opening the cavity being designed to receive a user's extremity through the first opening and to allow egress through the second opening;
a visualization module configured to superimpose visual media equivalent to a desired tattoo onto the user's extremity within the cavity, and to perform a method to generate a tattoo digital file, the method comprising:
providing a set of rules and directions related to a visualization framework to a processing module to facilitate conversion of digital tattoo images into tattoo digital files;
receiving a digital tattoo image in a digital media format;
preprocessing the digital tattoo image to enhance one or more visual components;
applying a detection algorithm to identify visual components of the digital tattoo image;
converting the analyzed digital tattoo image into a lattice structure for visual rendering and overlaying; and
transforming the lattice structure with the analyzed tattoo image into a tattoo digital file for use by the temporary tattooing apparatus;
a printer module disposed within the cavity to apply the desired tattoo, the printer module including one or more print heads for administering temporary tattoo ink to apply the temporary tattoo to the user's extremity; and
a user interface terminal configured to allow a user to select the temporary tattoo from among a number of candidate temporary tattoos and to adjust one or more properties of the temporary tattoo prior to application of the temporary tattoo.

14. An apparatus for applying a temporary tattoo to an extremity of a user, the apparatus comprising:
a housing defining a cavity extending therethrough, at least a portion of the housing being formed from a transparent material;
a user interface terminal configured to allow the user to select a desired temporary tattoo to be applied to the extremity of the user, responsive to the user placing the extremity within the cavity;
a visualization module configured to superimpose a visual media equivalent to the desired temporary tattoo onto the extremity within the cavity, the visualization module including:
one or more sensors configured to detect at least a size and shape of the extremity inserted into the cavity, and
one or more projectors configured to project the visual media equivalent to the desired temporary tattoo onto the extremity, such that the user can view the visual media equivalent to the desired temporary tattoo on the extremity through the transparent portion of the housing; and
a printer module disposed within the cavity to apply the desired temporary tattoo, responsive to the user approving the tattoo via the user interface terminal, the printer module including:
a plurality of print heads for administering temporary tattoo ink to apply the desired temporary tattoo to the extremity, and
a gantry system configured to move the plurality of print heads to facilitate application of the desired temporary tattoo,
wherein each of the plurality of print heads is independently movable on the gantry system;
wherein the user interface terminal is configured to allow the user to adjust one or more properties of the desired temporary tattoo prior to application of the temporary tattoo.

15. The apparatus of claim 14, wherein the user interface terminal is configured to allow the user to select the desired temporary tattoo from among a plurality of candidate temporary tattoos, and wherein the plurality of candidate temporary tattoos are stored in a remote database.

16. The apparatus of claim 14, further comprising a movable barrier configured to selectively restrict access to a portion of the cavity, thereby constraining placement of the extremity within the cavity.

17. The apparatus of claim 14, wherein the printer module comprises a plurality of print heads, and wherein at least one of the plurality of print heads is configured to apply with temporary tattoo ink.

18. The temporary tattooing apparatus of claim 1, wherein the visualization module comprises an augmented reality (AR) module configured to overlay the visual media equivalent to the desired tattoo onto a live view of the user's extremity.

19. The temporary tattooing apparatus of claim 1, wherein the printer module comprises a plurality of ink cartridges, each ink cartridge containing a different color of temporary tattoo ink.

20. The temporary tattooing apparatus of claim 1, further comprising one or more sensors configured to detect a position and orientation of the user's extremity within the cavity, and wherein the printer module is configured to adjust a position of the one or more print heads based on the detected position and orientation.

* * * * *